J. D. FIRMIN.
POLE PIECE FASTENING DEVICE.
APPLICATION FILED SEPT. 14, 1905.

922,760.

Patented May 25, 1909.

Witnesses:
George J. Schwartz
Fred J. Kinney

Inventor:
John D. Firmin.
By
Chas. E. Lord
Attorney.

UNITED STATES PATENT OFFICE.

JOHN D. FIRMIN, OF PLEASANT RIDGE, OHIO, ASSIGNOR TO THE BULLOCK ELECTRIC MANUFACTURING COMPANY, A CORPORATION OF OHIO.

POLE-PIECE-FASTENING DEVICE.

No. 922,760.  Specification of Letters Patent.  Patented May 25, 1909.

Application filed September 14, 1905. Serial No. 278,526.

*To all whom it may concern:*

Be it known that I, JOHN D. FIRMIN, citizen of the United States, residing at Pleasant Ridge, in the county of Hamilton and State of Ohio, have invented certain new and useful Improvements in Pole-Piece-Fastening Devices, of which the following is a full, clear, and exact specification.

This invention relates to dynamo electric machines and especially to the means for fastening laminated pole pieces to field frames.

Heretofore it has been customary to fasten laminated pole pieces to field frames by means of bolts which are screwed into tapped radial holes in the outer faces of the pole pieces or by means of bolts which are screwed into bars which extend transversely through the pole pieces or by through-bolts which pass entirely through the pole pieces, the heads being recessed into the inner pole faces. The first method is objectionable for the reason that it is difficult to properly thread the holes drilled in the ends of the pole pieces and if the threads in one of the holes are injured or improperly cut the pole piece is practically ruined. The second method is objectionable for the reason that the transverse rods of considerable size are required, thus necessitating the cutting away of considerable area of each lamina.

One of the objects of my invention is to secure the laminated pole piece to the field frame or yoke and to lock the bolts in place without necessitating considerable cost or labor.

A further object is to provide a holding means which will be simple and one which will permit the parts to be quickly assembled or taken apart when desired.
In carrying out my invention I provide a pole piece with attaching bolt or bolts which are locked in position in the pole piece after having been inserted in place.

My invention, from a more specific standpoint, consists in a field frame of a dynamo electric machine having a plurality of laminated pole pieces each of which is secured to the field frame by bolts extending through the latter into the pole piece, said bolts being locked or anchored in place in the pole piece by a rod or bar which extends transversely through openings in the laminae and bolts.

For a more complete understanding of my invention reference is had to the accompanying drawings in which—

Figure 1:
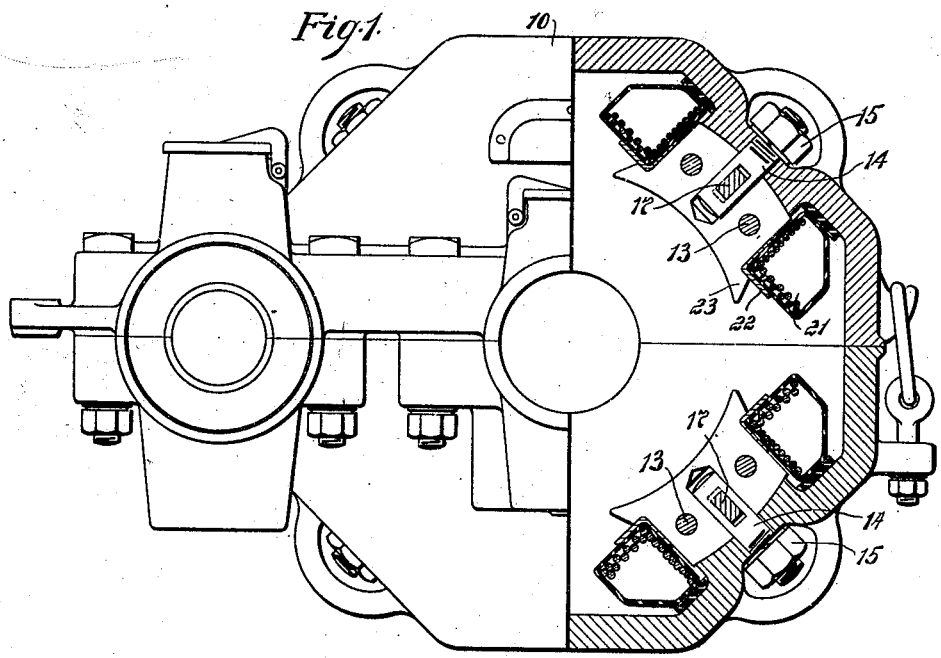
Figure 2:
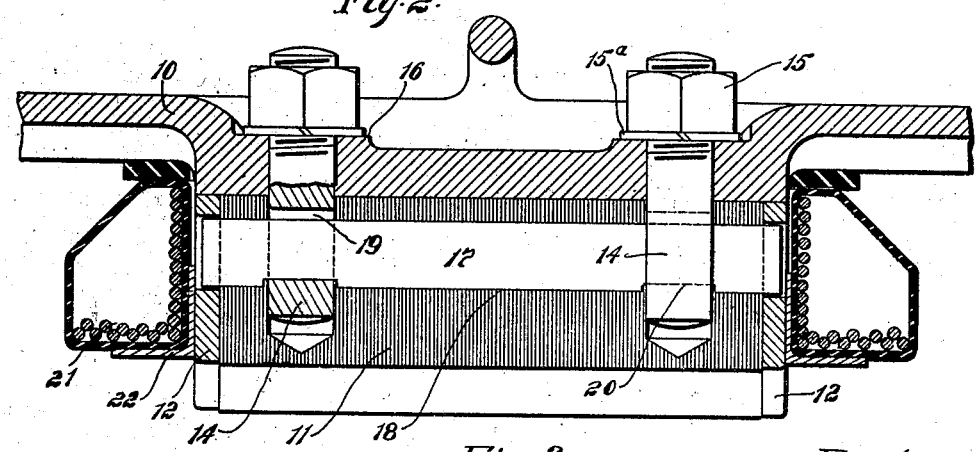
Figure 3:
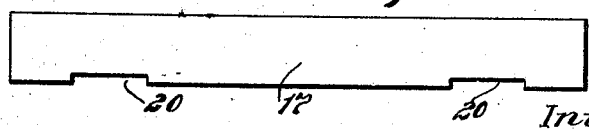
Figure 4:

Figure 1 shows a partial end view and partial sectional elevation of a railway motor having my invention applied thereto; Fig. 2 is a transverse section of a portion of a field frame and pole piece, parts being shown in elevation; and Figs. 3 and 4 are side and end views respectively of the locking rod or bar used in my invention.

I have shown my invention as applied to a railway motor, but it is evident that it is applicable to any type of dynamo electric machine having laminated pole pieces. I have shown at 10 a casing and field frame or yoke of a railway motor which casing is shown as divided into two portions along the line of the shaft, as in the customary manner. Extending inwardly from the field frame are a plurality of pole pieces. Each pole piece consists of a bundle of laminae 11 riveted or bolted together and to the side plates 12, by rivets or bolts 13, which pass transversely through the laminae as in the customary manner. As is shown in Fig. 1 the laminated pole pieces are provided with curved outer faces which abut against curved projecting faces on the field frame. In this instance each pole piece is fastened to the field frame by two bolts 14, which pass through the field frame into the pole piece. These bolts are provided at their outer ends with nuts 15 and washers 15ª which rest upon flat faces 16 on the outer surface of the field frame. The holes which receive the bolts are preferably drilled into the laminae after they have been assembled. If desired however the openings can be punched in the laminae separately before they are assembled. To hold the pole pieces and bolts in position I lock the bolts to the pole pieces by transverse rods or bars 17, which extend through openings 18 in the laminae and openings 19 in the attaching bolts. The openings 18 in the laminae are preferably punched therein. As is shown most clearly in Figs. 2 and 3 the locking bar is provided on its inner side with notches 20, which notches are engaged by the bolts to prevent displacement of the locking bar.

Each pole piece is provided with a field coil 21 mounted on a frame 22, which frame rests on shoulders 23 adjacent to the inner face of the laminae. The parts are assembled as follows: The laminæ and side plates 12 are first riveted together. The bolts 14 are next inserted in the radial holes, provided in the outer face of each pole piece for that purpose, and are locked in position by a rod or bar 17 inserted through the end plate and the punched holes in the laminæ. Frame 22 and coil 21 are next slipped on to the pole piece which is then ready to be bolted to the frame. By tightening the nuts 15 the pole pieces can be drawn into position. The notches 20 provide against accidental displacement of the bars 17 before the coil has been placed on the pole piece. If it is desired to remove the bar the bolts can be lowered slightly into the radial holes, when the perforations therein will be alined with the openings in the laminæ.

It is evident that the bolts 14 need not in all cases be perforated, but may be provided with notches or any other means as heads or projections for engaging the locking bar. It is also evident that either more or less than two attaching bolts may be employed for securing each pole piece to the frame.

It will be seen that my structure requires no considerable cost or labor. The bar 17 is preferably made of steel and may be comparatively small in size. It will thus be seen that only small openings need be punched in the laminæ to receive the rods 17 and therefore a better magnetic condition will result than in the structures previously employed.

It will also be seen that as none of the punchings are cut entirely in half only two rivets are required to keep the laminæ in alinement.

I aim in my claims to cover all modifications which do not depart from the spirit and scope of my invention.

What I claim as new and desire to secure by Letters Patent is:—

1. In a dynamo-electric machine, a field frame, a laminated pole piece, a bolt extending through the frame into the pole piece, means for anchoring the bolt into the pole piece comprising a member extending transversely into the pole piece and inter-locking with said bolt after the latter has been inserted the full distance into the pole piece, and means at the opposite end of the bolt for drawing the end of the pole piece against the frame.

2. In a dynamo-electric machine, a field frame, a laminated pole piece having a longitudinal or radial opening and a transverse opening, a bolt extending through the frame and seated in said longitudinal or radial opening, said bolt having a slot in alinement with the transverse opening in the pole piece, means for anchoring said bolt in the pole piece comprising a member extending through the transverse opening in the pole piece and engaging in the slot of the bolt, and a nut at the outer end of the bolt for drawing the end of the pole piece tightly against the field frame.

3. In a dynamo-electric machine, a field frame, a laminated pole piece, a bolt passing through the frame into the pole piece, means for anchoring the bolt in the pole piece comprising a member extending transversely into the pole piece and through the bolt, and means engaging the outer end of the bolt for drawing the pole piece firmly against the frame.

4. In a dynamo-electric machine, a field frame, a laminated pole piece, a plurality of bolts passing through the frame into the pole piece, a member passing transversely through the laminæ and through the bolts for anchoring the latter in the pole piece, and means engaging the outer ends of the bolts for drawing the pole piece tightly against the field frame.

5. In a dynamo-electric machine, a field frame, a laminated pole piece, a perforated attaching bolt extending through the frame into the pole piece, means passing transversely through the laminæ and through the perforation in the bolt for anchoring the latter in the pole piece, and means engaging the outer or free end of the bolt for drawing the end of the pole piece tightly against the field frame.

6. In a dynamo electric machine, a field frame or yoke, a pole piece consisting of laminæ having alined perforations, a bolt extending through the frame or yoke into the laminæ and having a perforation registering with the perforations in the laminæ, and a locking rod or bar extending through the perforations in the laminæ and bolt to lock the latter in place.

7. In a dynamo electric machine, a field frame or yoke, a laminated pole piece, a pair of attaching bolts provided with perforations extending through the frame into the pole piece, and a locking rod having a pair of notches on the under side thereof, said locking rod passing transversely through the laminæ and attaching bolts and having its notches engaged by the bolts whereby the bolts and rod are locked in place.

In testimony whereof I affix my signature, in the presence of two witnesses.

JOHN D. FIRMIN.

Witnesses:
ARTHUR F. KWIS,
FRED J. KINSEY.